(12) United States Patent
Pintsov

(10) Patent No.: US 8,291,239 B2
(45) Date of Patent: Oct. 16, 2012

(54) METHOD AND SYSTEM FOR AUTHENTICATING SENDERS AND RECIPIENTS IN A CARRIER SYSTEM AND PROVIDING RECEIPT OF SPECIFIED CONTENT BY A RECIPIENT

(75) Inventor: Leon A. Pintsov, West Hartford, CT (US)

(73) Assignee: Pitney Bowes Inc., Stamford, CT (US)

( * ) Notice: Subject to any disclaimer, the term of this patent is extended or adjusted under 35 U.S.C. 154(b) by 561 days.

(21) Appl. No.: 12/579,647

(22) Filed: Oct. 15, 2009

(65) Prior Publication Data

US 2010/0131759 A1    May 27, 2010

Related U.S. Application Data

(60) Provisional application No. 61/117,599, filed on Nov. 25, 2008.

(51) Int. Cl.
*G06F 21/00* (2006.01)
(52) U.S. Cl. ...................................................... 713/189
(58) Field of Classification Search .................. 713/189; 705/406, 407
See application file for complete search history.

(56) References Cited

U.S. PATENT DOCUMENTS

| 5,586,036 | A | 12/1996 | Pintsov |
| 5,883,810 | A | 3/1999 | Franklin et al. |
| 6,430,543 | B1 | 8/2002 | Lee et al. |
| 6,527,178 | B1 | 3/2003 | Gordon et al. |
| 6,820,065 | B1 * | 11/2004 | Naclerio ........................ 705/401 |
| 2002/0073043 | A1 | 6/2002 | Herman et al. |
| 2003/0212631 | A1 | 11/2003 | Foth et al. |
| 2004/0112950 | A1 * | 6/2004 | Manduley et al. ............ 235/375 |
| 2006/0161506 | A1 | 7/2006 | Stumm et al. |
| 2007/0299792 | A1 | 12/2007 | Pintsov et al. |
| 2008/0147423 | A1 | 6/2008 | Braun et al. |

* cited by examiner

*Primary Examiner* — Benjamin Lanier
(74) *Attorney, Agent, or Firm* — Brian A. Lemm; Charles R. Malandra, Jr.; Steven J. Shapiro

(57) ABSTRACT

Methods and systems for authenticating senders and recipients in a carrier system and providing receipt of specified content by a recipient are provided. A one-time recipient identification code is generated that can be entered into the delivery agent's portable terminal. Data is protected against eavesdropping by encryption and by splitting cipher text and an encryption key into two parts that are not accessible to any single party except at the moment of the mail unit delivery.

14 Claims, 10 Drawing Sheets

| MAIL UNIT TRACK NO (70) | RECIPIENT NAME/ ADDRESS AND LOCATION (GEOCOORD) (72) | MAIL UNIT CONTENT (74) | MAIL UNIT PRODUC-TION DATE (76) | MAIL UNIT WEIGHT (78) | MAIL UNIT DIMENS (80) | MAIL UNIT COLOR (82) | CIPHERTEXT1 (84) | CIPHERTEXT2 (86/88) | DECRYPT KEY PART1: (OTRIC) (90) | DECRYPT KEY PART2: |
|---|---|---|---|---|---|---|---|---|---|---|
| 57XX.001 | 23 BARRY PLACE STAMFORD CT 06057 LAT 42 DEG 40 MIN 62.55 SEC N LONG 3 DEG 39 MIN 34.57 SEC E | VIAGRA TABLETS RX 12356799 PHILOMEL RX 23459875 | 17 NOV 2009 12:09:07 | 10 OZ | 10X7X5 INCHES | BROWN | A01BFT985A B885EC768C | B01BFT985FE F183E076EFA 4311DF51B35 ......... F34CB7A5931 | 12345 | 9874653 0227813 7410326 6013953 |
| 57XX.002 | 75 NEW STREET SHELTON CT 06484 LAT 42 DEG 38 MIN 52.77 SEC N LONG 3 DEG 45 MIN 35.64 SEC E | PRIVATE LEGAL AGMNT AND CONSENT DOCS | 18 NOV 2009 17:31:08 | 3 OZ | 12X8X2 INCHES | YELLOW | B01AFT675DF A685BC75DF | 901BFT185AC B8830C164F3 59075F21B53 ......... AC678234B1D | 75138 | 7974533 0810816 6400386 6013955 |
| 57......... | ......... | ......... | ......... | ......... | ......... | ......... | ......... | ......... | ......... | ......... |
| 57......999 | 75 OLD STREET HARTFORD CT 06117 LAT 42 DEG 42 MIN 72.21 SEC N LONG 3 DEG 54 MIN 42.91 SEC E | XYZ CORP 1000 SHARES STOCK CERT | 19 NOV 2009 8:30:47 | 2 OZ | 11X9X0.5 INCHES | WHITE | C01BAT985E B985EC76SF | B01BFT985DE A7860C7275B 610A9F21B37 ......... E7FF432BAD1 | 91734 | 6804154 1377017 2410326 1013957 |

FIG. 5

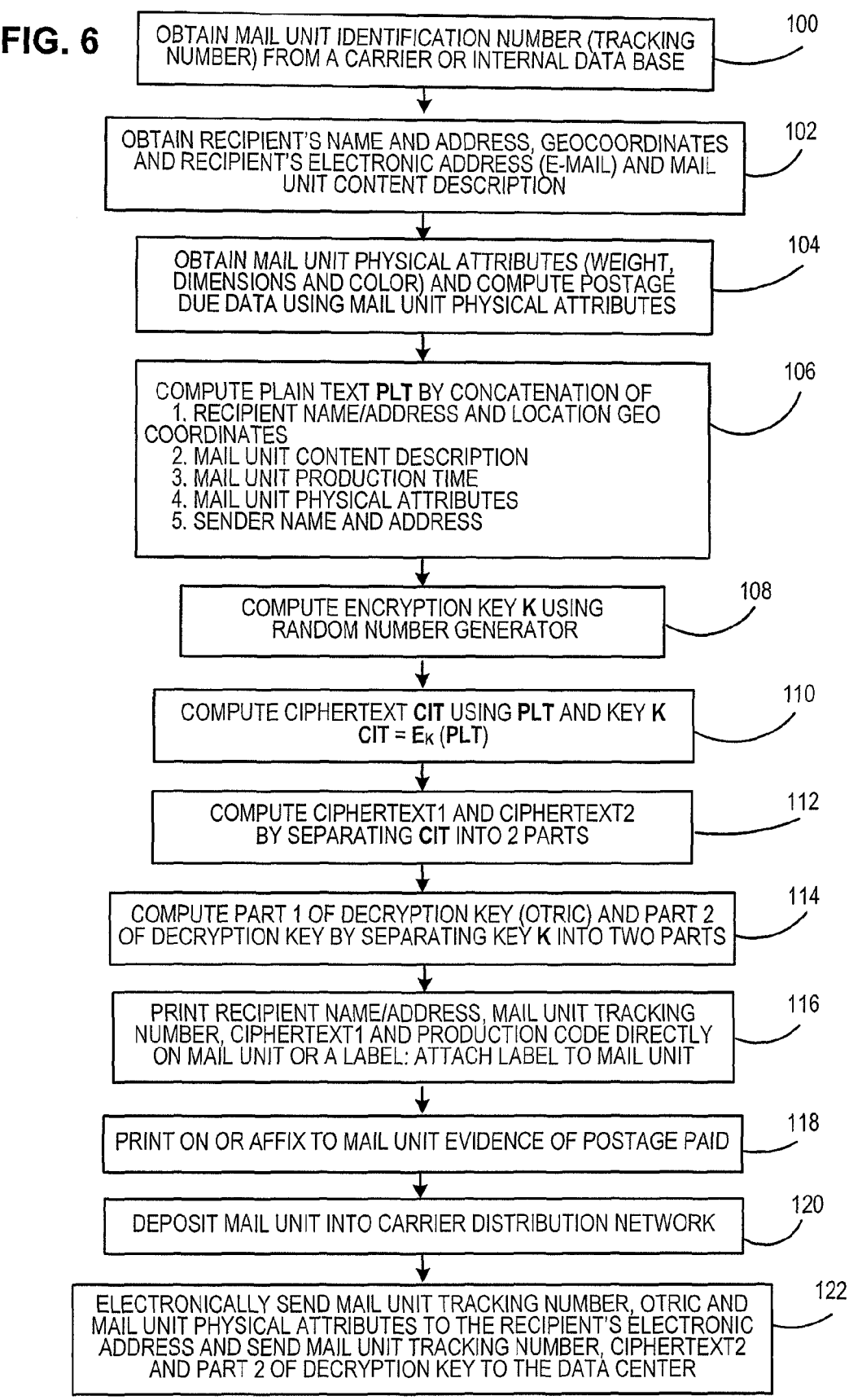

METHOD AND SYSTEM FOR AUTHENTICATING SENDERS AND RECIPIENTS IN A CARRIER SYSTEM AND PROVIDING RECEIPT OF SPECIFIED CONTENT BY A RECIPIENT

CROSS REFERENCE TO RELATED APPLICATIONS

This application claims the benefit of U.S. Provisional Application Ser. No. 61/117,599, filed Nov. 25, 2008, the specification of which is hereby incorporated by reference.

FIELD OF THE INVENTION

The invention disclosed herein relates generally to delivery systems and methods, and more particularly to methods and system for authenticating senders and recipients in a carrier system and providing receipt of specified content by a recipient.

BACKGROUND OF THE INVENTION

In many mailing and shipping applications there is a need to protect the senders and recipients of mail items from errors, either inadvertent or deliberate. Errors can be a result of incorrect computer-driven data processing or human errors, as well as a result of deliberate attempts on the part of unscrupulous people to deceive or defraud the system. When errors occur the results can be tragic, such as, for example, when medicine is shipped and consequently consumed by a wrong recipient. In other instances errors result in significant and irrecoverable loss of financial resources, such as, for example, when valuable documents such as stock certificates are delivered to a wrong recipient. Yet in some other instances private and confidential documents may be sent to or received by a wrong recipient resulting in the loss of valuable data with multiple legal consequences. Thus, there is a need to positively identify (mutually authenticate) senders and recipients in mail communication systems. This means that senders want to have assurances that mail units sent have been received intact by their intended recipients. Likewise mail recipients want to be assured that mail units they received or about to receive were sent by their purported senders and include correct content, and not some possibly dangerous materials such as explosives, anthrax powder or a wrong medicine.

Mail communication systems typically consist of the sender (a party responsible for mail unit preparation and induction into a carrier distribution system), the carrier (the party responsible for processing and delivery of mail units) and the recipient (usually the intended recipient, a party to which a mail unit is supposed to be delivered in the absence of any errors). Carriers employ human personnel whose task is to deliver mail units to human recipients or deposit them into protected mail receptacles. Human clerks charged with delivery of mail units are referred to below as "Delivery Agents." A mail piece, also referred to as a mail unit, can be of any type of a physically constrained item, such as a letter, flat, parcel, packet and the like. In the context of the present invention mail units always have valuable content, whose nature and description must be protected from unauthorized parties. It is desirable also to enable effective detection of the theft or unlawful substitution of the content of mail units, since such mail units are almost always exposed to a variety of carrier employees who may or may not have personal integrity.

Existing systems for mutually authenticating senders and recipients have various defects. Systems employed by the carriers frequently require that the recipient sign for the mail unit he/she is about to receive. The signature is facilitated through a portable communication device with a stylus and the data is sent for archival and dispute resolution to the carrier's data center. However, there is no connection between the signature and the mail unit content, and it is hard to ascertain the real identity of the recipient. For example, any member of the household or the office can receive and sign for the mail unit without any verification. Besides, devices employing stylus-enabled signatures are expensive and unreliable with a poor quality of data, making dispute resolution difficult at best. The privacy of data is hard to maintain when there is a requirement to protect the recipient from unauthorized data intrusion, such as, for example, when the mail unit is received not by the exact intended recipient, but by one of the members of the household or an office co-worker. The identity of the sender is typically revealed to an outside observer without opening the mail unit via the sender's origination address. And, when the delivery agent makes an error and brings a mail unit to the wrong address, it is sometimes difficult to detect because the incorrect recipient may not notice small differences in the address, especially when they are expecting mail units themselves. This has become more and more prevalent due to the wide proliferation of e-commerce making house and office delivery of packages an everyday occurrence.

SUMMARY OF THE INVENTION

The present invention overcomes major difficulties and defects of the prior art. It replaces the physical signature of the recipient with a much more reliable personal "data signature" which is facilitated via a one-time recipient identification code that can be entered into the delivery agent's portable terminal. Data is protected against eavesdropping by encryption and by splitting cipher text and an encryption key into two parts that are not accessible to any single party except at the moment of the mail unit delivery. The data is preferably immediately erased after delivery of the mail unit. The location of delivery is encrypted and verified after decryption against current location information available from a GPS system. These and other advantages will become apparent from the detailed description of the invention.

DESCRIPTION OF THE DRAWINGS

FIG. 5 illustrates a model database of information stored on a computer/server at the sender's facility or at the Data Center;

FIG. 6 illustrates in flowchart form a process of generating information elements present on the mail unit and stored in the Data Center in accordance with present invention;

DESCRIPTION OF THE PREFERRED EMBODIMENTS

Figure 1:
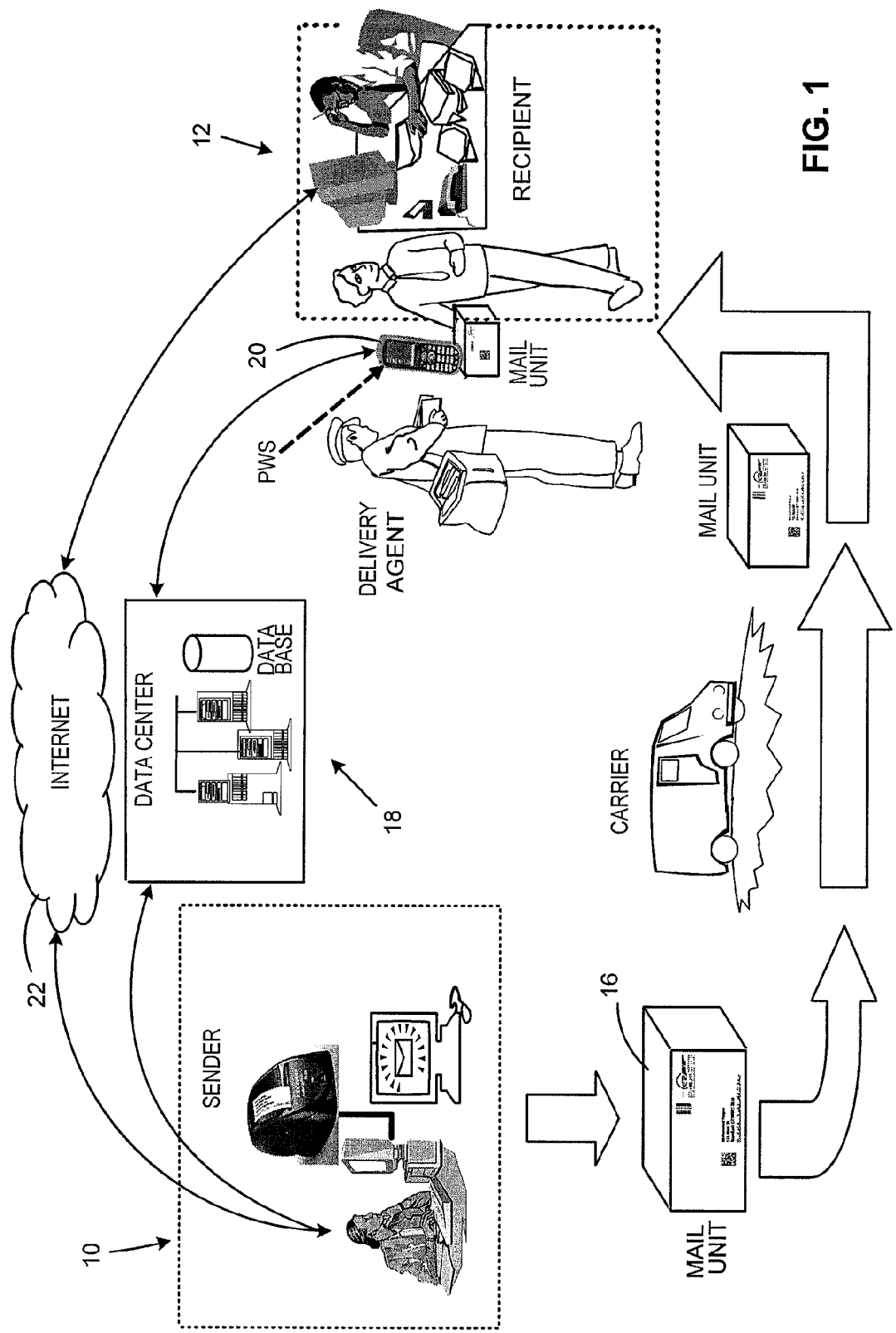
FIG. 1 illustrates a basic system adapted for use with the invention.

Reference is now made to FIG. 1 depicting a basic system adapted for use with the invention. It includes a sender's subsystem generally shown at 10 and further depicted in FIG. 2. In addition the basic system contains a recipient's subsystem generally shown at 12, consisting of a computing device operated by the recipient and adapted to receive information from the sender's subsystem 10. This computing device can be a personal computer, a smart telephone, PDA or any other suitable device. The advantage of a smart telephone is that it is portable and can be operated to send and receive information under control of the recipient wherever and whenever the recipient chooses to do so. This may become useful for the process of dynamic redirection of mail unit delivery adapted for the use with the method of the present invention described below.

The basic system also includes a carrier delivery network/process generally depicted by wide arrows shown at the bottom of the FIG. 1. The delivery process operates on a mail piece (mail unit) 16 further described in conjunction with FIG. 3. Finally the basic system includes a Data Center 18 and a delivery agent portable wireless connected scanner device (PWS) 20. The Data Center consists of a computer/server that is operatively connected to the sender's subsystem 10. The Data Center 18 computer/server is also connected to the delivery agent's portable device PWS 20. It should be expressly noted here that the Data Center 18 can be a part of the sender's subsystem or can be operated by an independent entity (the carrier or a trusted third party, such as the assignee of the present invention) depending on the application requirements. The sender and recipient subsystems can be connected directly via the Internet 22 or through the Data Center 18 (not shown) again depending on the application requirements. All connections between computing devices in FIG. 1 are facilitated via public or private data networks and enabled to exchange application-relevant data (the nature of which will be apparent from the further description below) between the devices controlled by sender, recipient, carrier or trusted third party.

Figure 2:
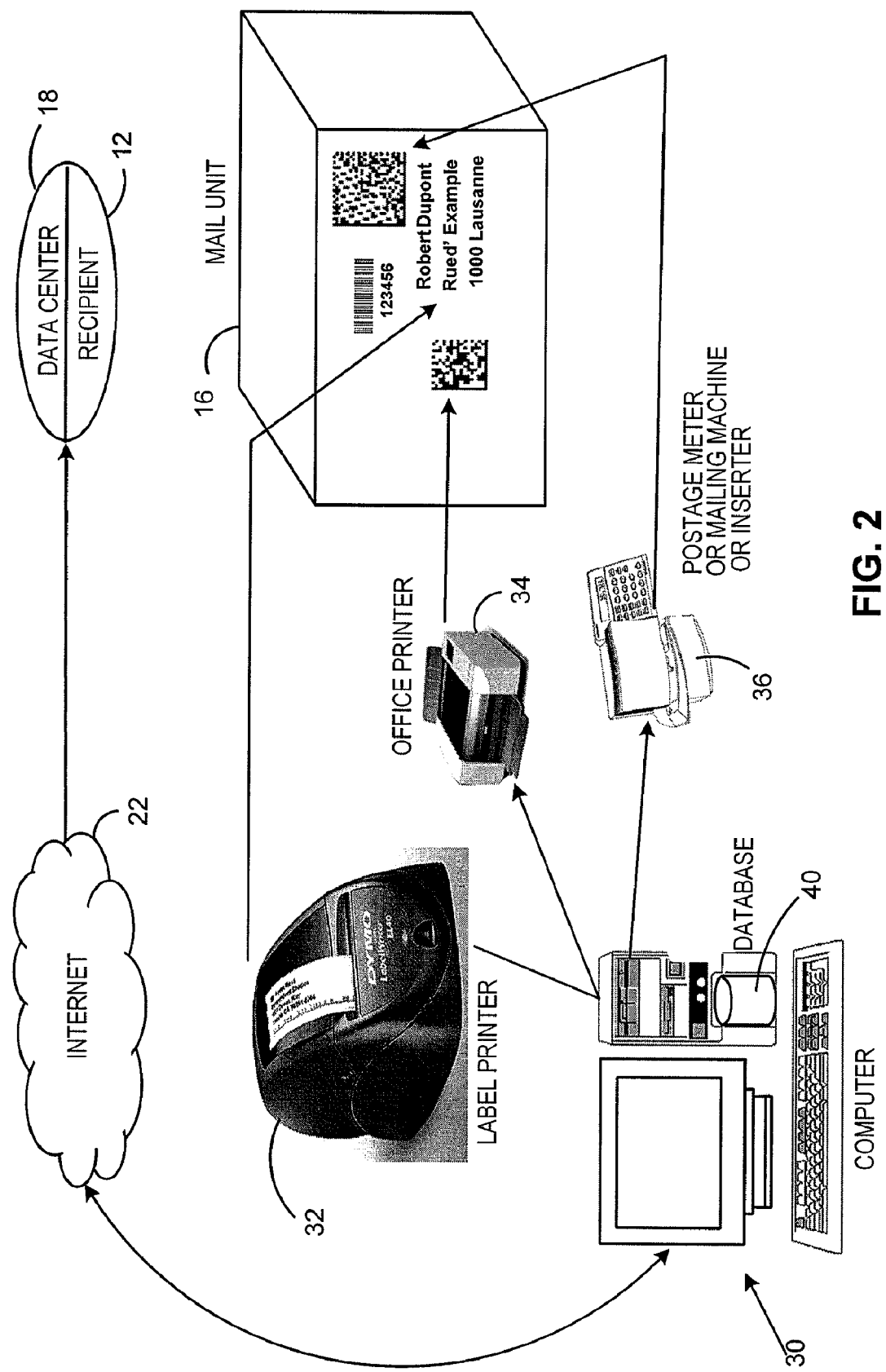
FIG. 2 illustrates a sender's mail unit generation system with information elements adapted for use with the invention.

Reference is now made to FIG. 2 showing the sender's subsystem 10. It consists of a computer 30 (such as a common personal computer), and several peripheral devices connected to the computer 30. These devices can include a label printer 32, an envelope printer 34, and a postage meter 36. The computer 30 is operatively connected to a data base 40 containing addressing, location and content and mail unit physical attributes data for mail units that the sender sends to recipients as a part of its operation. The label printer 32 can print labels displaying arbitrary bitmapped data including one and two dimensional barcodes and alphanumeric information. The envelope printer 34 is also capable of printing arbitrary bitmapped data including one and two dimensional barcodes and alphanumeric information directly on mail units (when such mail units are flat, e.g., envelopes of various sizes). Finally, the sender subsystem 10 is connected via the Internet 22 to other computing devices (e.g., data center 18, recipient subsystem 12) as has been already explained in conjunction with the description of FIG. 1.

Figure 3:
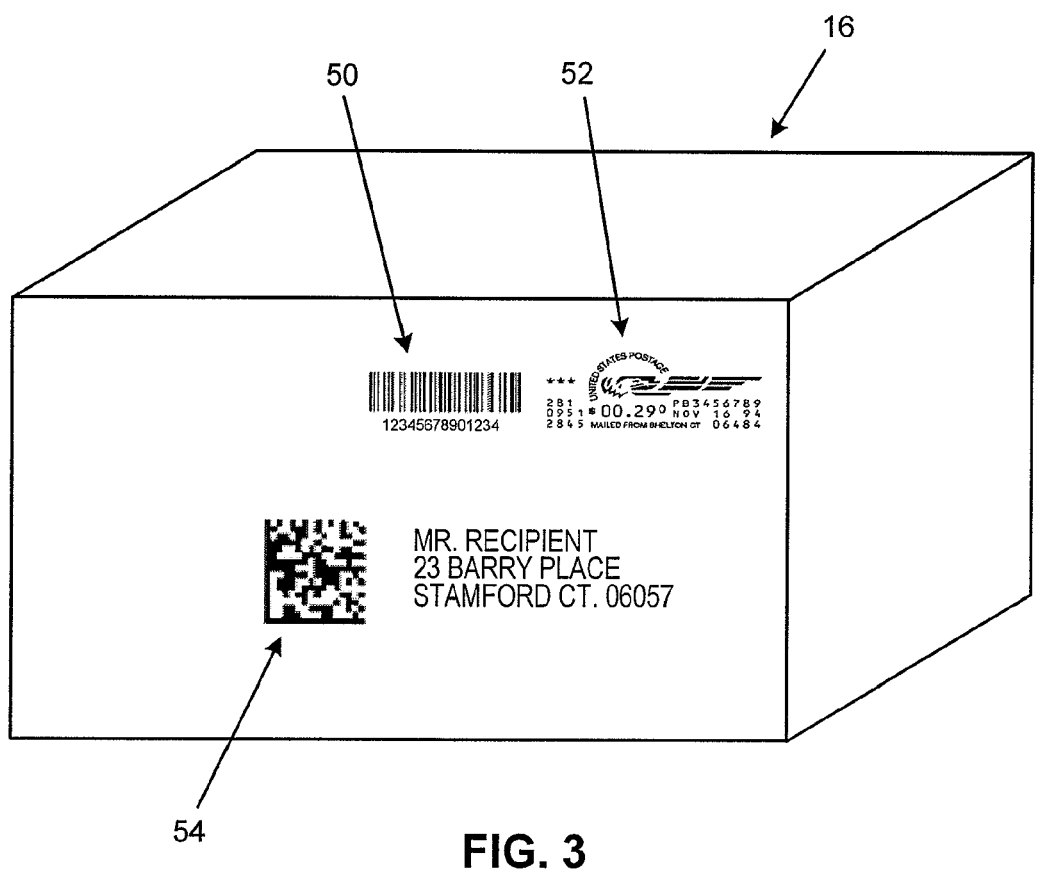
FIG. 3 illustrates a mail unit with information elements adapted for use with the invention.

Reference is now made to FIG. 3 showing a mail unit 16 adapted for the use with the present invention. The mail unit 16 displays three informational elements, namely a Mail Unit Tracking Number 50, evidence of postage paid 52, and a partial ciphertext 54, the nature and purpose of which will become apparent from the description of FIGS. 5, 6 and 7. It should be noted that the ciphertext 54 could contain the Mail Unit Tracking Number 50, thus avoiding presenting the Mail Unit Tracking Number 50 in plain text separately. The present arrangement where the Mail Unit Tracking Number 50 and partial ciphertext 54 are placed separately and in different formats is a reflection of a common practice where tracking numbers are standardized in their data content, format and placement to allow already existing equipment and processes to operate without any changes. It should be also noted that the size and arrangement of the partial ciphertext 54 is determined by scanning reliability requirements. When scanners are inexpensive, the partial ciphertext 54 can be very small (8-10 bytes) allowing for a very large modules (in the case of a 2-D bar code such as Data Matrix) or very large bars (in the case of a linear bar code such as Code 128). This insures highly reliable scanning by the PWS 20 explained in conjunction with FIG. 4.

Figure 4:
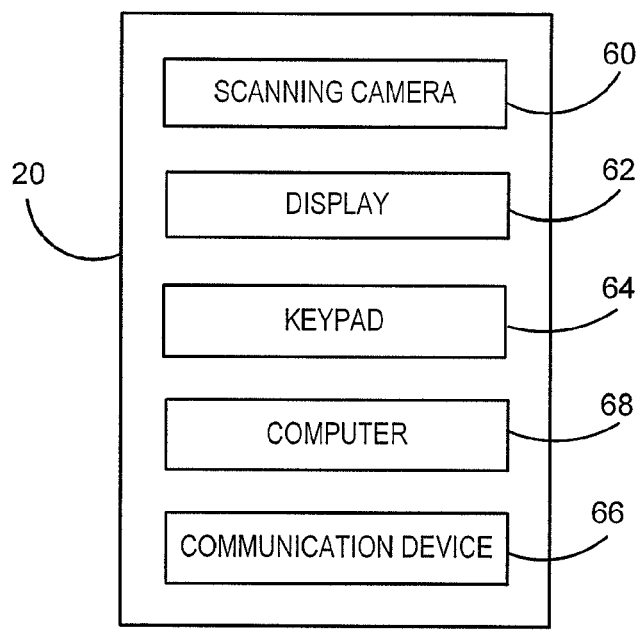
FIG. 4 illustrates in block diagram form a portable wireless connected scanner (PWS) device adapted for use with the present invention.

Reference is now made to FIG. 4 showing a block diagram of a portable wireless scanner device (PWS) 20 adapted for the use with the present invention. These devices have five basic functions. First, the PWS 20 is enabled to send and receive data by a communication module 66 using a private or public digital communication network, such as Internet. Second, the PWS 20 is enabled to optically scan and capture data, such as barcodes or alphanumeric text, using for example, a scanning camera 60, and convert the captured data into a digital format. Third, the PWS 20 has the capability to display data to a human operator, using, for example a display 62. Fourth, the PWS 20 is equipped with a numeric or alphanumeric keypad 64 to allow a human operator to enter data into it. And finally, the PWS 20 is controlled by a computer 68 that can be programmed to process information and control various functions of the devices in a coordinated manner, such as, for example, to sound an alarm or erase data. Modern mobile telephones equipped with a camera and e-mail enabled (so called smart phones or 2G and 3G devices) are examples of PWS devices that possess all functionality required for the practice of the present invention. In some modes of employment of the present invention, the camera 60 may be optional.

Reference is now made to FIG. 5 showing the organization of a database of information stored on a computer/server at the sender's subsystem 10 or at the Data Center 18. The database is indexed by Mail Unit Tracking Number (also referred to as the Mail Unit Identification Number) generally shown in the first column 70 of the table. The next column 72 contains name and the conventional (mailing) address of the intended recipient, and may also contain geographic coordinates (latitude and longitude) of the location where delivery of the mail unit is to take place. The next column 74 describes the content of the mail unit in human interpretable text, and may also include codified references (product code). The nature of the description may include, for example, the names of medical supplies, medicine, documents, objects of value and the like, and their unique identification numbers when available. For example, for medicine it could be Rx numbers, for electronic devices it could be their serial numbers, and for documents it could be their reference codes or unique identifiers. The next column 76 contains the mail unit production date, which can be used for sender reference in case the mail unit can not be delivered due to an error that occurred during the mail unit production. The next three columns (shown at 78, 80, 82) contain a description of the mail unit's physical attributes, such as its weight, dimension and color of its covering material or box. The next column 84 contains a first portion of the ciphertext (partial ciphertext1) which is obtained from the ciphertext resulting from the encryption of the plaintext consisting of the elements in columns 72, 74, 76, 78, 80 and 82 of the table in FIG. 5. The next column 86 contains the remaining portion of the aforementioned ciphertext (partial ciphertext2). The physical attributes in columns 78, 80, 82 (weight, dimension, color of the wrapping material and the like) are typically known after the mail unit has been prepared and finished and ready to be deposited or inducted into the carrier distribution system. This means that the calculation of the CipherText in collectively contained in columns 84, 86 could proceed only after mail unit has been finished and physical attributes entered (e.g. manually or via semi-automated measurement and data entry system) into the computer designed to calculate the cipher text. However, many industrial shipping and fulfillment systems (for example in mail order pharmacies and other mail order establishments) are automated. In this case the number and type of different boxes and containers used for shipping and their physical attributes (weight and dimensions) are limited and known in advance. Similarly, physical parameters (weight and dimensions) of all objects that constitute the content of the packages and parcels (e.g., bottles, tubes and other containers with pills and medicine) are also known in advance and stored in the data base containing a description of the merchandise that is offered for sale by the mail order house. This means that the physical attributes of the mail unit can be computed immediately after the order information is received and before actual assembly and finishing of the mail unit. Columns 88 and 90 collectively contain a decryption key that is also divided into two parts. Computation of these parts is explained in conjunction with FIG. 6.

Referring now to FIG. 6 there is illustrated in flowchart form a process of generating information elements present on the mail unit and stored in the Data Center (in a database organized as depicted in FIG. 5) in accordance with the present invention. In step 100, the sender's computer 30 (FIG. 3) obtains the Mail Unit Identification Number 50 (tracking number) from a carrier or internal database. In step 102, the sender's computer 30 obtains a plurality of data elements associated with the mail unit, which can include, for example, the sender's name/address, recipient's name/address, location geo-coordinates, recipient's e-mail address, and the Mail Unit Content description. These can be obtained based on a manual input to the computer 30, using an input device such as a keyboard, touch screen or the like, by a user, an automatic input from an application program operating on the computer 30, or by retrieving from a database. The data that is required to be specified by the recipient ordering the content of the mail unit, e.g., Rx number, delivery address, is obtained from the recipient in any of the number of conventional methods such as telephone, internet/web or fax. In step 104, the sender's computer 30 obtains the mail unit physical attributes (such information can be obtained from the database 40 as described above) and computes the postage due data. In step 106, the sender's computer 30 then calculates a plaintext data string PLT by combining and/or concatenating a portion of the obtained data elements, e.g., sender's name/address, recipient name/address and location geo-coordinates, Mail Unit Content description, Mail Unit Production Time, and Mail Unit Physical Attributes. Then in step 108 the computer 30 generates a private encryption key K using any suitable random number generator as is well known in the art. This key K, for example, can be a 128 bit key that can be used in conjunction with the Advanced Encryption Standard (AES) algorithm, a modern symmetric key encryption technique that is broadly used in data encryption. It should be expressly noted here that the method of the present invention works equally well with any encryption algorithm (symmetric or asymmetric) and AES is selected here as a preferred embodiment for concreteness, convenience and strong security properties. The size of the key K can be any suitable size (128 bits, or 256 bits, or 512 bits) depending on the desired security level and computational performance requirements.

Then in step 110 the sender computer 30 calculates a ciphertext CIT of the PLT data string using key K and the AES algorithm or any other suitable encryption algorithm:

$$CIT=E_K(PLT)$$

Then in step 112 the ciphertext CIT is split into two portions, Ciphertext1 and Ciphertext2, as shown in FIG. 5 in columns 84 and 86, respectively. The size of the portions is dictated (as has been mentioned) by the scanning reliability requirements since the Ciphertext1 will preferably be presented on the mail unit in a machine-readable format and must be reliably captured by inexpensive PWS devices with low resolution and contrast sensitivity levels, and possibly without special illumination. Thus, Ciphertext1 is relatively small while Ciphertext2 is relatively large. In step 114, the encryption key K (which is in the preferred AES algorithmic embodiment also a decryption key) is also separated into two portions, namely Decryption Key Part 1 and Decryption Key Part 2, as shown in the last two columns 88, 90 of the table of FIG. 5. Thus the key K is a concatenation K=(Decryption Key Part 1, Decryption Key Part 2).

The size of the Decryption Key Part 1 is relatively small (16 to 20 bits), since it must be converted into a code that can be remembered and quickly entered into PWS device 20 during the delivery process. This portion of the key K is also termed a One-Time Recipient Identification Code (OTRIC), since it serves the purpose of uniquely identifying the recipient in conjunction with receiving a specific mail unit (only one time). The security and privacy of the data handling in the present invention is guaranteed because both the ciphertext CIT and the decryption key K are split between several entities and come together only at the moment of delivery (when data must be verified before the mail unit can be transferred from the delivery agent to the recipient). Thus, only the sender knows all of the data ingredients all the time, and the recipient can view the plaintext only for a brief moment sufficient for verification of its correctness during the delivery data verification process and before all data is erased (described later with respect to FIG. 7). The carrier and the data center do not have access to private information, and while the delivery agent in principle can view a display of the plaintext, this can be easily prevented by the recipient who can protect the display 62 of the PWS 20 while entering the OTRIC into it (described further with respect to FIG. 7).

In step 116, at least some of the information generated or obtained by the sender computer 30 is then printed, either on the mail unit or a label to be applied to the mail unit, using the label printer 32, envelope printer 34, and/or postage meter 36. The information can include the Recipient Name/Address, Mail Unit Identification Number 50, the Ciphertext1, and product code. In step 118, the evidence of postage paid 52 is printed or affixed to the mail unit, and in step 120 the mail unit is then deposited into the carrier's distribution network for delivery to the recipient. In step 122, the OTRIC, and optionally the Mail Unit Identification Number 50 and mail unit physical attributes are electronically sent to the recipient (or communicated via phone or fax), and the Mail Unit Identification Number 50, Ciphertext2, and Part 2 of the decryption key are electronically sent to the data center 18. If the Data Center 18 is being operated by the sender, the PWS 20 will need to know the Data Center 18 electronic address (i.e., e-mail or web link) in order to exchange information with the Data Center 18. This means that a part of the cipher text (the Ciphertext1, which is the cipher text that is provided on the mail unit in the machine-readable format next to the recipient mailing address) must contain the electronic address of the sender (Data Center) where the rest of the information needed for verification is stored in the database. If, on the other hand, the Data Center 18 is operated by the carrier or a trusted third party, then the electronic address of the Data Center 18 is known in advance, is fixed and can be pre-stored (pre programmed) in the PWS 20 and the electronic address of the Data Center 18 does not need to be a part of the variable data provided on the mail unit.

Figure 7:
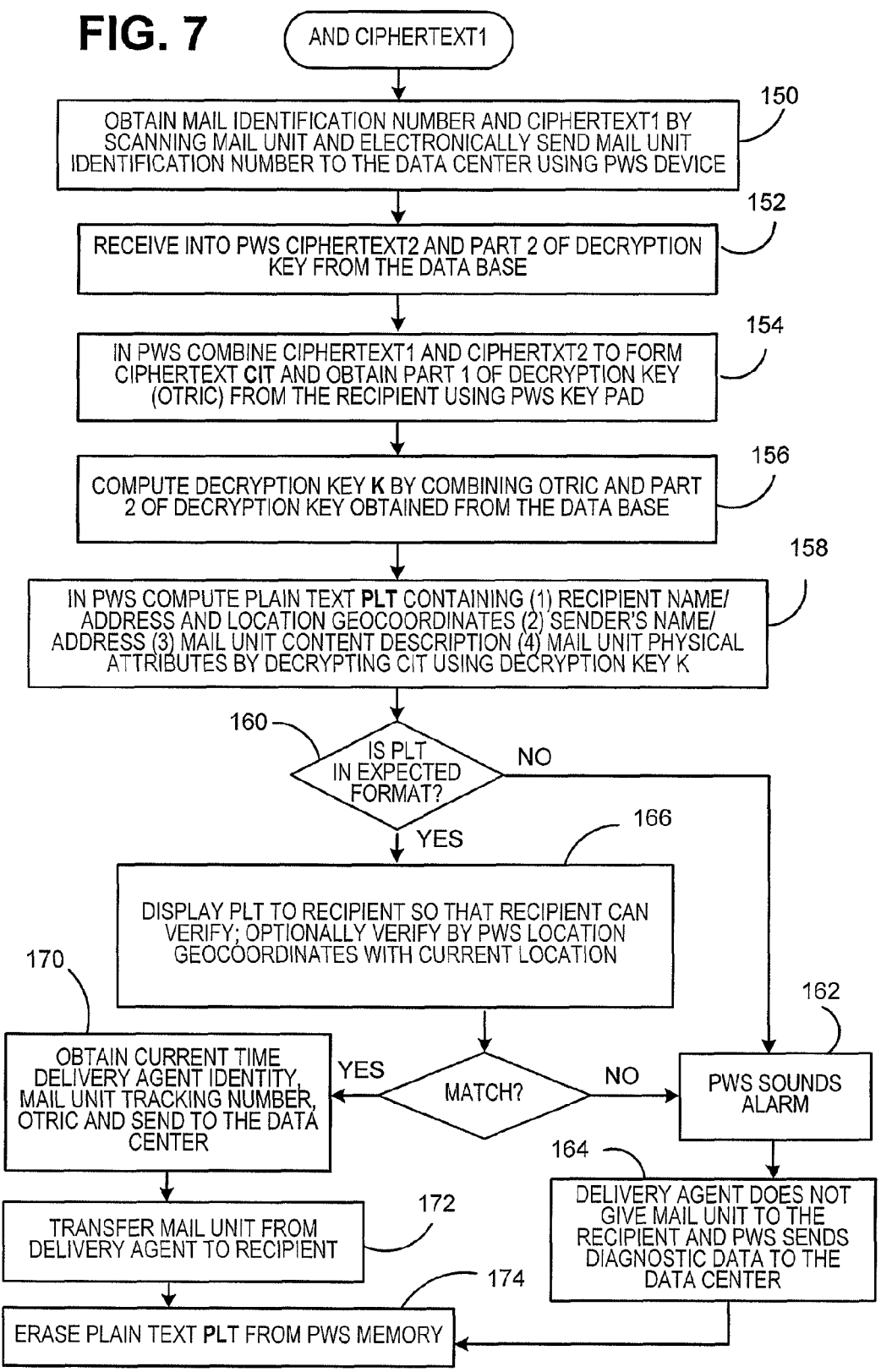
FIG. 7 illustrates in flowchart form a sender-recipient verification process during mail unit delivery.

Referring now to FIG. 7, there is illustrated in flowchart form a sender-recipient verification process during the delivery of a mail unit. In step 150, when the delivery agent is delivering a mail unit 16, the Mail Unit Identification Number 50 and Ciphertext1 is obtained from the mail unit 16 by scanning it with the PWS 20, and the Mail Unit Identification Number 50 is sent to the data center 18 (using the data center address obtained from the Ciphertext1 or pre-programmed in the PWS 20). Alternatively, the information obtained from the mail unit 16 can be input manually in to the PWS 20 using the keypad 64 of the PWS 20. In step 152, the data center 18 obtains the Ciphertext2 and Part 2 of the decryption key, using the received Mail Unit Identification Number 50, and sends them to the PWS 20. In step 154, the Ciphertext1 and Ciphertext2 are combined in the PWS 20 to obtain the complete Ciphertext CIT, and Part 1 of the decryption key, provided to the recipient as the OTRIC, is input to the PWS 20 by the recipient using the keypad 64. In step 156, the OTRIC and Part 2 of the decryption key are combined in the PWS 20 to obtain the decryption key K. In step 158, the PWS 20 then calculates the plaintext PLT containing the Recipient Name/Address and location geo-coordinates, the Sender's Name and Address, the Mail Unit Content description, and the Mail Unit Physical Attributes by decrypting the CIT using the decryption key K. In step 160 it is then determined by the PWS 20 if the PLT is in an expected format. When the PWS 20 decrypts the ciphertext CIT there are 3 possibilities: (1) total gibberish—a collection of meaningless digits; (2) text that may have some meaning, but is incorrect; or (3) correct text. The PWS 20 can be programmed to look for a properly formatted (structured) plaintext (resulting from the decryption). For example, the first line may be text (e.g., name of the recipient), the next four lines may be the address of the recipient, the next lines could be the weight and dimensions of the mail unit, and then text describing the content of the mail unit. While the PWS 20 cannot know whether the name is the correct name of the recipient, the address is the correct address, the weight and dimensions of mail unit and its content have correct values, it can know (i.e., be programmed to know what to look for in the decrypted file) whether something looks like a name or weight (based on the structure of the plaintext). Thus, if the decrypted text is not in the expected format (e.g., is either gibberish or incorrectly formatted text), then in step 162 the PWS 20 can declare the decryption failed, and sound an alarm or provide some other indication that the mail unit is not being correctly delivered even before showing the decrypted text to the recipient. In step 164, the delivery agent will not give the mail unit to the recipient and the PWS 20 can then send diagnostic data to the data center 18 to determine the reason for the incorrect delivery attempt. In step 174, the PLT can then be erased from the memory of the PWS 20, thereby protecting the privacy and confidentiality of the information.

If in step 160 it is determined that the decrypted text is in the expected format, e.g., it is correctly structured and not gibberish, then in step 166 it is provided to the recipient, using for example the display 62 of the PWS 20, or by printing a paper copy using a printer (not shown) provided with the PWS 20, and the recipient can then perform a verification check, i.e., verify that the mail unit being received from the delivery agent is the mail unit described by the information in the PLT provided by the PWS 20, by making a comparison. Optionally in step 166, the PWS 20, if provided with GPS functionality, can verify it is in the proper location based on the decrypted geo-coordinates. In step 168, the recipient will determine if there is a match between the provided text (either displayed or printed), optionally in conjunction with the recipient's records of expected deliveries (including the identification number and physical attributes that may have been received in advance of the delivery in step 122 of FIG. 6), and the mail unit being received from the delivery agent. If in step 168 the recipient determines that there is not a match, the recipient will provide an indication to the PWS 20 (using, for example, the keypad 64 of the PWS), and in step 162 the PWS 20 will sound an alarm or provide some other indication to the delivery agent that the mail unit is not being correctly delivered. In step 164, the delivery agent will not give the mail unit to the recipient and the PWS 20 can then send diagnostic data to the data center 18 to determine the reason for the incorrect delivery attempt, and in step 174, the PLT can then be erased from the memory of the PWS 20, thereby protecting the privacy and confidentiality of the information. If the recipient indicates that the information does match in step 168, then in step 170 the PWS 20 will obtain the current time, delivery address, the identification of the delivery agent, the Mail Unit Identification Number 50, and the OTRIC and send these data elements to the data center 18 as proof of delivery. In step 172, the mail unit can then be transferred from the delivery agent to the recipient. In step 174, the PLT can then be erased from the memory of the PWS 20, thereby protecting the privacy and confidentiality of the information. At the end of the verification process that takes place during delivery, the recipient is reasonably assured of the identity and address of the sender as well as the mail unit content and integrity, while the sender is assured that mail unit has been delivered to the intended recipient intact, at a given time by a given delivery agent, at the recipient's location as it has been presented to the sender by the recipient. Thus, the difficulties and defects of the prior art have been substantially overcome.

An additional feature of the present invention (dynamic redirection of a mail unit) works as follows. When the sender or recipient initiates a transaction, e-mail messages (or other communications such as telephone or fax messages) are exchanged as to the nature of the mail unit to be sent and received (e.g., medicine, documents, or other objects of value). When informational details are agreed upon as in a traditional e-commerce transaction, the sender sends to the recipient the tracking number (Mail Unit Identifier) and OTRIC together with any other relevant information, such as, for example, the mail unit content description, price and delivery address. Upon receipt of this information or shortly thereafter (but after the mail unit already has been inducted into the carrier distribution network), the recipient may decide to change the place and time of scheduled delivery (for example due to unforeseen circumstances such as an unexpected trip, an appointment or a need for receiving the mail unit earlier or later than normally scheduled, etc.). In this case the recipient may send (before scheduled delivery of the mail item) a message to the sender subsystem and/or the data center. Before sending the message, the recipient authenticates himself or herself using the OTRIC and the mail unit tracking number (mail unit identifier). The message itself contains the mail unit tracking number (mail unit identifier), original and new delivery address, which could be specified as a mailing address, a location specified in geo-coordinates or even as an intersection of named streets. In addition, the recipient can specify a time period when he/she could be found at the new address. If the message of changed delivery address was sent only to the sender's subsystem, the sender's subsystem, after authenticating the recipient's identity (based on the mail unit tracking number and OTRIC), immediately and automatically forwards a change of delivery address message (containing both the old and new delivery address, and delivery time interval as desired by the recipient) to the Data Center 18. Upon receipt of this message, the Data Center 18 immediately forwards this message to the PWS 20 controlled by the delivery agent who currently has possession of the mail unit 16. Upon receiving this message, the delivery agent can deliver the mail unit 16 to the new address where the verification procedure described in conjunction with FIG. 7 takes place. The OTRIC code also allows the recipient to authenticate himself/herself for the purpose of payment to the carrier for dynamic redirection of the mail unit 16.

The method of present invention can also be adapted for anonymous delivery of a mail unit to storage receptacles that are locked with digital locks. In this case, the mail unit is delivered into a storage receptacle location, which may be, for example a public facility, the identification of which is communicated to the recipient together with the OTRIC. The OTRIC in this case serves as a key to open the digital lock that protects the content of the receptacle.

The method of present invention can be further enhanced to achieve improved authentication of the recipient (if desired by the sender) by adding biometric information during the verification process. To accomplish this, the PWS device 20 can be equipped with biometric sensor capable of digitizing biometric information (e.g., a fingerprint). In this case during the verification process the recipient may be required to submit his biometric information (for example by applying his/her finger to the sensory/digitizing panel of the PWS 20), that can then be transmitted to the sender together with the OTRIC, location data, date/time stamp, identity of delivery agent, and other information as described above. The biometric information can be retrieved by the sender and compared with similar information that has been already stored in a data base of biometric information accessible to the appropriate authority if required, for example in the case of dispute.

In practice, the sender-recipient verification process illustrated in FIG. 7 may be hindered if the wireless network coverage is not perfect and the PWS 20 is unable to communicate with the Data Center 18. Specifically, it is well known that even the best wireless networks have certain geographic areas where the signal is week or it is difficult to connect to the network. It is especially true for rural areas, while the system and method of present invention must be universal in order to meet universal coverage requirements of postal/carrier delivery networks. To accommodate this requirement, the system and method of the present invention can be modified as follows. Typically all postal delivery offices or local branches have wireless or wired internet connections. This allows for the delivery agent's PWS 20 to perform pre-computation (including downloading of all necessary data from the data center 18) before embarking on the delivery route. In this case the mail units (items) are scanned in the delivery office using the PWS 20 after they have arrived at the delivery office or storage area but prior to dispatch for delivery. In this manner the three components of data (CipherText1, CipherText2, and Part 2 of the Decryption Key) required to be available during delivery are downloaded using the wireless or wired Internet connection from the data center 18 into the PWS 20 before actual delivery. The mail item identifier serves as an index as has been described before. When the delivery agent delivers the item, the delivery agent requests the recipient to enter the OTRIC number into the PWS 20 in the same way as during the normal operation. If the OTRIC entered is correct, the PWS 20 displays all relevant data to the now already authenticated recipient and upon verification encrypts and stores this data in the memory of the PWS 20. The verification data including the OTRIC is uploaded from the PWS 20 into the data center 18 when delivery agent brings his/her PWS 20 back into the delivery office upon completion of the delivery route. This is always possible since all delivery offices are connected to the data center 18 as has been mentioned before. During the delivery process the item is identified by its identifier (tracking ID code) and the three aforementioned components of the data (all required for verification data except the OTRIC) are retrieved from the PWS 20 memory upon scanning the item identifier using the PWS 20 or manually entering it into the PWS 20. Another aspect of the present invention allows for use of regular data-exchange enabled telephones without scanning capabilities as the PWS 20. In this case the mail unit 16 displays only the mail unit identification number 50 that is human-readable. During delivery the delivery agent manually enters this number 50 into the PWS 20 using the keypad 64. In this case the ciphertext CIT is not split and partially displayed on the mail unit but is stored in its entirety in the data base. Using the received identification number 50, the complete ciphertext CIT and Part 1 of the decryption key are obtained by the data center 18 from the data base and send to the PWS 20. The operation then continues with the recipient entering Part 1 of the decryption key, using the keypad 64. Operation then proceeds as described above with respect to FIG. 7 from step 156.

Figure 8A:
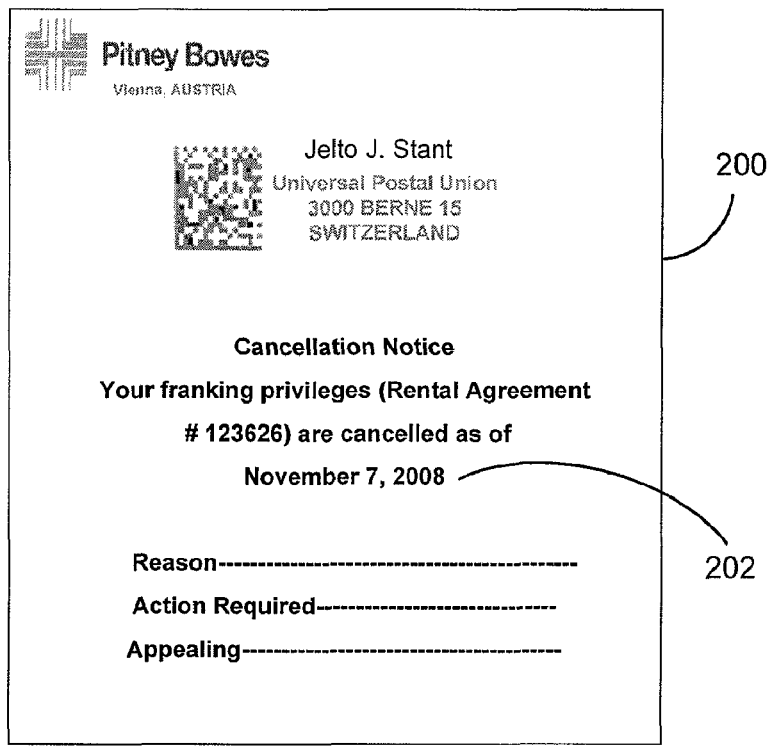
FIGS. 8A and 8B illustrate an example of an original cancellation notice and an attempted fake cancellation notice.
Figure 8B:
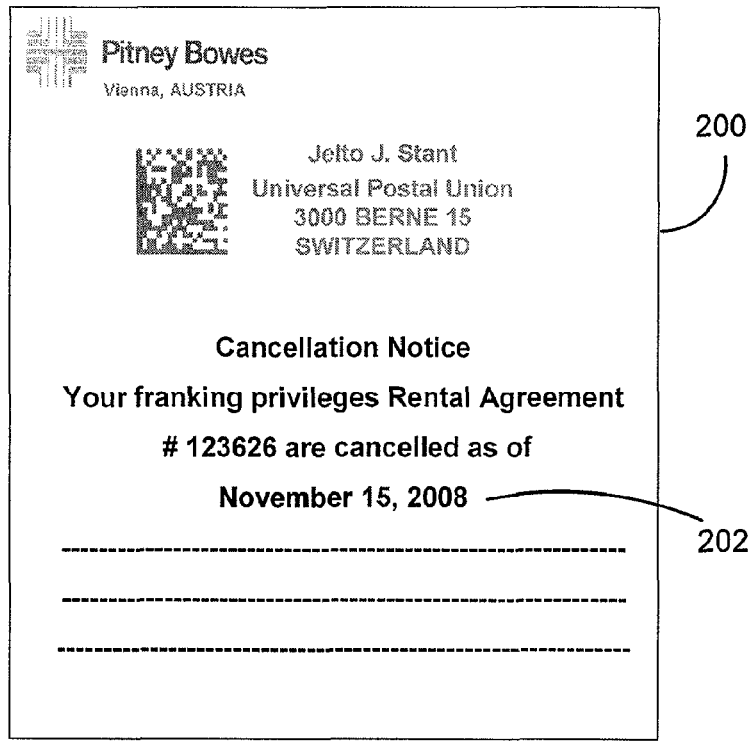

Yet another aspect of the present invention provides receipt of specified content by a recipient in case of a dispute. There are many mailing applications when it is desirable for the sender of mail item to have proof (possibly legally admissable proof) that certain information was sent to a recipient, and the content of the information received by the recipient. It is also very desirable to protect information being sent from access by unauthorized parties. Specifically, the content of received dunning notices, bills, insurance policy cancellations, and the like could be disputed by recipients even if they would admit the fact of receiving such communications. For example, a recipient could attempt to alter an original cancellation notice 200 as illustrated in FIG. 8A by changing the content, e.g., date of cancellation 202, as illustrated in FIG. 8B.

Figure 9:
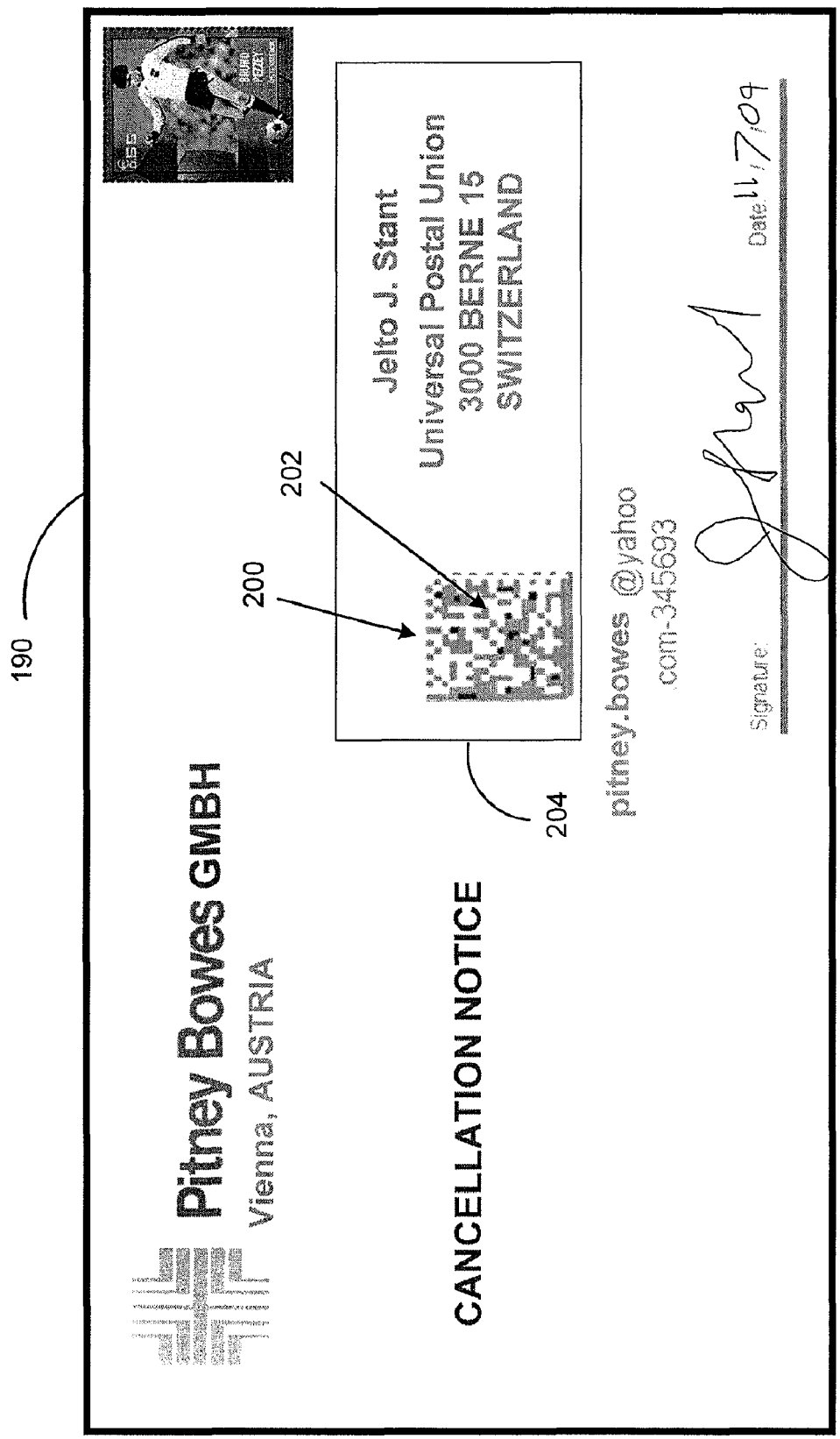
FIG. 9 illustrates a mail item containing the original cancellation notice.

The present invention allows an independent, trusted third party, such as a mailing service provider (Postal Operator or a Carrier), to provide proof of the content of mail communications, referred to as Critical Information, delivered to a recipient identified by the name/address information present on the mail item. As illustrated in the mail item 190 in FIG. 9, the mailer computes a hash value of the Critical Information included in the documents mailed, and adds graphic security data elements to the computed hash value. The resulting data block (referred to as a Content Protection Data Block or CPDB) is printed in a machine-readable format, e.g., 2-d barcode 200, within the address block 204 of the mail item 190 such that it is visible through a window or on the mail item itself. The graphic security data included in the barcode 200 as illustrated in FIG. 9 is represented by the darker regions 202 (signifying a watermark or the like). Before or at delivery time the Postal Operator or a Carrier can scan the mail item 190, capture and store the barcode 200 (CPDB) together with the date of mailing/receipt, and (unique) identifiers for both the sender and the recipient (e.g. name and address of both the recipient and the sender of the mail item). In case of a dispute, i.e., the recipient claims a mail piece was not received or the mail piece did not contain the contents as claimed by the sender, the sender may request the CPDB and associated information as proof of receipt (delivery to the recipient) and of the content of the information in question. If the recipient would deny receiving information and attempt to copy the CPDB on another forged document with a different content, such an attempt would be detectable because of the graphic security data that would not be reproducible in the fraudulent copy.

Critical Information (CI) is defined as information requiring integrity protection. For example, in a billing application it could be the due date, the total amount of the bill, the itemized charges, the name of the bill recipient, and the like. In insurance cancellation notices, it could be the policy number, the date of effective cancellation, the name of the policy holder, the reason for cancellation, and the like. In all cases the CI is generated by computer and can be viewed as a string of symbols.

Figure 10:
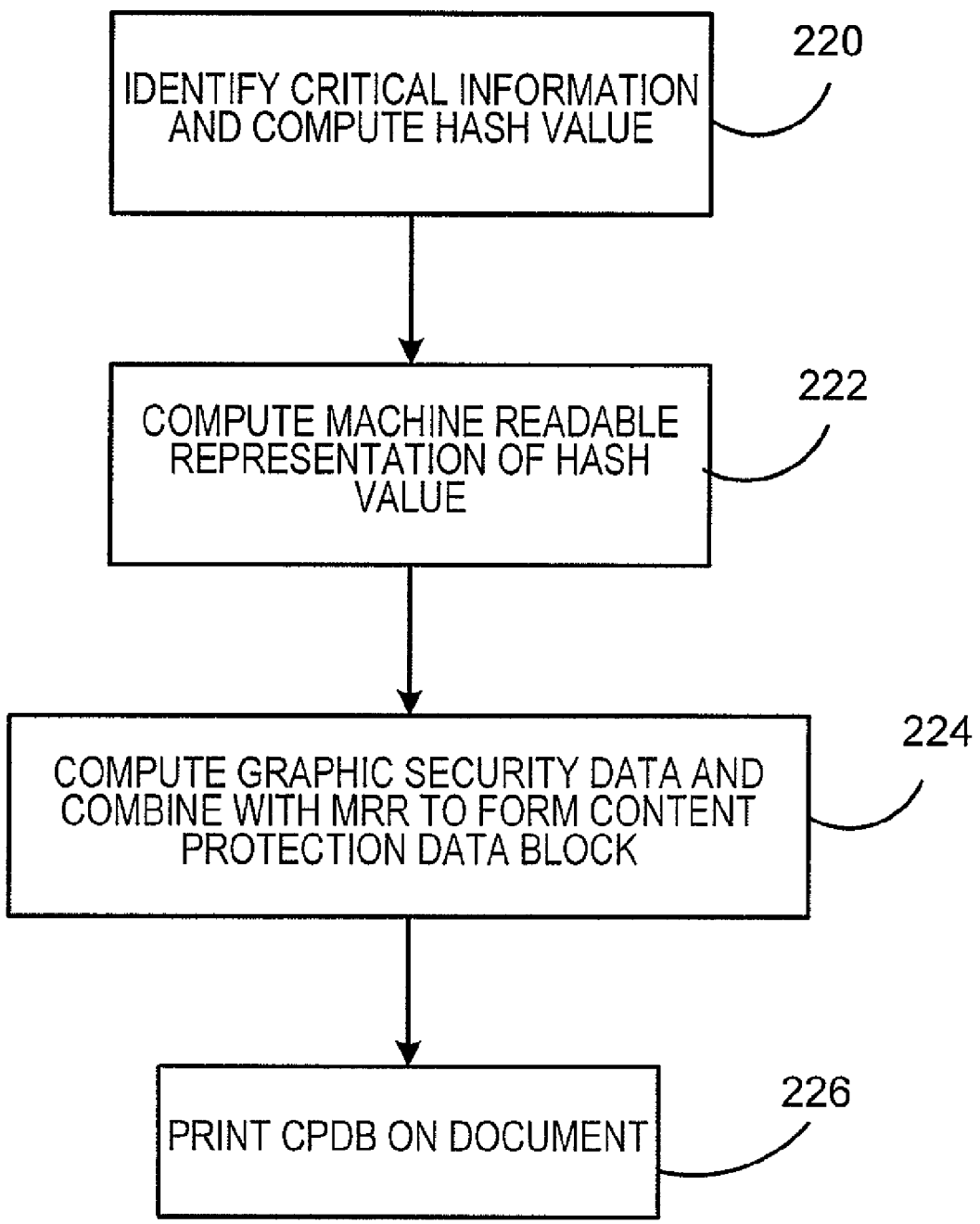
FIG. 10 illustrates in flowchart form a mail item generation process.

FIG. 10 illustrates in flowchart form a mail item generation process that will be performed, for example, by the sender's mailing system 10 illustrated in FIG. 1. In step 220 the critical information (CI) to be included in a communication is identified and a Hash Value of the CI is computed, HV(CI), for example SHA(CI) where SHA is one of the standardized and publicly available hash function algorithms (in this case Secure Hash Algorithm). In step 222, a Machine Readable Representation of HV(CI), referred to as the MRR, is computed. The MRR may be, for example, a two-dimensional bar code (Data Matrix). In step 224, Graphic Security Data (GSD) to be embedded into the MRR is computed, for example, a watermark, and the GSD is combined with the MRR to form the CPDB. In step 226, the CPDB is printed on a document (or envelope) and the document is inserted into the envelope such that the CPDB is visible through a window (see FIG. 9).

Figure 11:
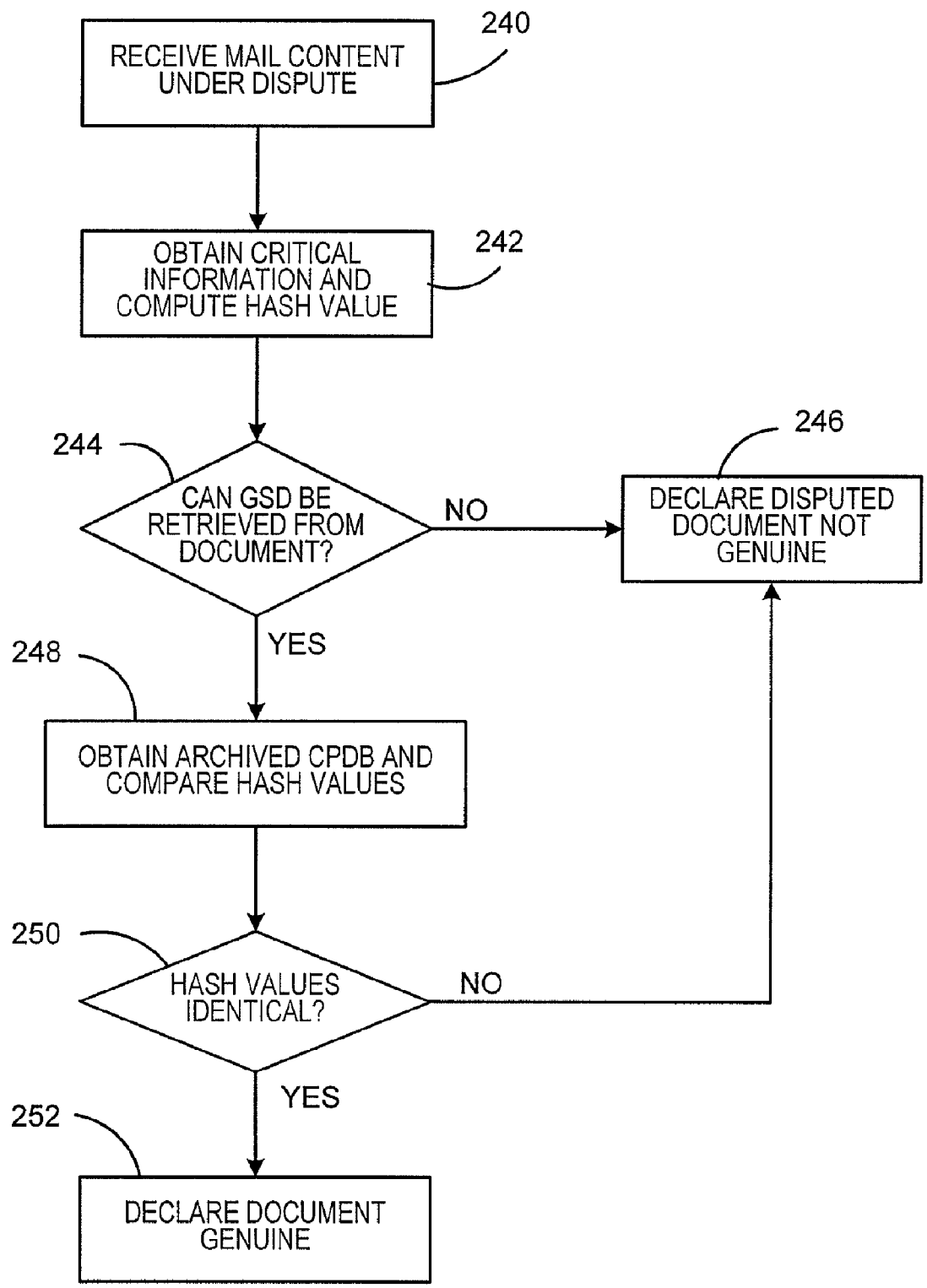
FIG. 11 illustrates in flowchart form verification that certain information was sent to a recipient, and the content of the information received by the recipient.

The CPDB is archived (by a trusted third party or carrier that will provide proof of the content of mail communications) by storing an image of the CPDB together with attribute data for the mail item, such as, for example, the name/address of the recipient, the name/identification/address of the sender, the mail item identifier, the date of mailing, the time of scan, the identifier of the scanner/mail processor, the identifier of the facility where mail item has been scanned, and the date of scanning). In case of a dispute arising as to whether or not certain information was sent to a recipient, and the content of the information received by the recipient, the CPDB can be verified as illustrated in FIG. 11. In step 240, the mail content be disputed is received. In step 242, the critical information (CI) is identified and entered into a computing system where a hash value is computed (similarly as described with respect to item 222 of FIG. 10. In step 244, the GSD is attempted to be retrieved from the document. If in step 244 the GSD is unable to be retrieved, this indicates that the document is not the original document and in step 246 the disputed document is declared not genuine and a forensic investigation will be needed to be performed to determine, if possible, the alterations that were made. If in step 244 the GSD is able to be retrieved (indicating the document is an original), then in step 248 the archived CPDB is obtained (using the attribute data for the mail item). In step 250, the hash value generated from the disputed document is compared with the hash value associated with the archived CPDB to determine if they are identical. If in step 250 it is determined that the hash values are identical, then in step 252 the disputed document is deemed to be genuine and accurate, i.e., no alterations have been made. If in step 250 it is determined that the hash values are not identical, this indicates that the document has been altered in some manner from its original form, and in step 246 the disputed document is deemed to be not genuine and a forensic investigation needs to be performed to determine, if possible, the alterations that were made.

While preferred embodiments of the inventions have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for a mail processing system including a processing device to prepare a mail piece for sending to a recipient comprising:

obtaining by the processing device a plurality of data elements associated with the mail piece, the plurality of data elements including the recipient's name, an identification number for the mail piece, and physical attributes of the mail piece;

combining, by the processing device, the plurality of data elements to form a data string;

encrypting the data string using a cryptographic key to form an encrypted ciphertext;

separating, by the processing device, the cryptographic key into a first key portion and a second key portion and the encrypted ciphertext into a first ciphertext portion and a second ciphertext portion;

printing the first ciphertext portion on at least one of the mail piece and a label to be applied to the mail piece;

electronically sending the first key portion to the recipient; and electronically sending the second key portion, the second ciphertext portion and the identification number for the mail piece to a data center for storage.

2. The method of claim 1, wherein encrypting the data string further comprises:

generating, by the processing device, a cryptographic key; and using the generated cryptographic key to encrypt the data string to form the encrypted ciphertext.

3. The method of claim 1, wherein the plurality of data elements further includes the recipient's address and a description of the mail piece's contents.

4. The method of claim 1, wherein printing the first ciphertext portion further comprises:

printing the first ciphertext portion in a machine readable format on at least one of the mail piece and a label to be applied to the mail piece.

5. The method of claim 1, wherein printing the first ciphertext portion further comprises:

printing the recipient's name, the recipient's address and the identification number for the mail piece on the mail piece or a label to be applied to the mail piece.

6. The method of claim 1, wherein the first key portion is a combination for an electronic lock of a storage receptacle into which the mail piece will be delivered.

7. A method of verifying proper delivery of a mail piece being delivered by a carrier from a sender to a recipient using a portable wireless device, the method comprising:
   receiving by the portable wireless device an identification number for the mail piece and a first portion of an encrypted ciphertext that are provided on the mail piece;
   electronically sending the received identification number to a data center;
   electronically receiving from the data center a second portion of an encrypted ciphertext and a first portion of a cryptographic key;
   combining, by the portable wireless device, the first portion of the encrypted ciphertext and the second portion of the encrypted ciphertext to form a complete encrypted ciphertext;
   receiving, in the portable wireless device, a second portion of the cryptographic key from the recipient;
   combining, in the portable wireless device, the first portion of the cryptographic key and the second portion of the cryptographic key to form a complete cryptographic key;
   decrypting, by the portable wireless device, the complete encrypted ciphertext using the complete cryptographic key to form a plaintext message, the plaintext message including at least a portion of the recipient's name, an identification number for the mail piece, and physical attributes of the mail piece;
   determining, by the portable wireless device, that the plaintext message is in an expected format;
   providing, by the portable wireless device, the plaintext message for the recipient to view; and
   receiving, by the portable wireless device, an indication of acceptance of the mail piece by the recipient.

8. The method of claim 7, wherein receiving by the portable wireless device an identification number for the mail piece and a first portion of an encrypted ciphertext that are provided on the mail piece further comprises:
   scanning the mail piece using a scanning device of the portable wireless device to read the identification number for the mail piece and the first portion of the encrypted ciphertext that are provided on the mail piece.

9. The method of claim 7, wherein receiving, in the portable wireless device, a second portion of the cryptographic key from the recipient further comprises:
   receiving from a keypad of the portable wireless device the second portion of the cryptographic key from the recipient.

10. The method of claim 7, wherein the plaintext message further includes at least a portion of an address for the recipient and a description of the mail piece's contents.

11. The method of claim 7, wherein the plaintext message further includes geo-coordinates for an address of the recipient, the method further comprising:
   determining, using a global positioning system of the portable wireless device, that the mail piece is being delivered to the recipients address based on the geo-coordinates included in the plaintext message.

12. The method of claim 7, wherein determining, by the portable wireless device, that the plaintext message is in an expected format further comprises:
   determining if lines of text included in the plaintext message are properly formatted.

13. The method of claim 7, further comprising:
   obtaining by the portable wireless device a current time and an identification of a delivery agent of the carrier that is delivering the mail piece to the recipient; and
   electronically sending the current time, the identification of the delivery agent, the identification number for the mail piece, and the second portion of the cryptographic key from the portable wireless device to the data center.

14. The method of claim 7, wherein providing, by the portable wireless device, the plaintext message for the recipient to view further comprises:
   displaying the plaintext message using a display of the portable wireless device.

* * * * *